Figure 1:
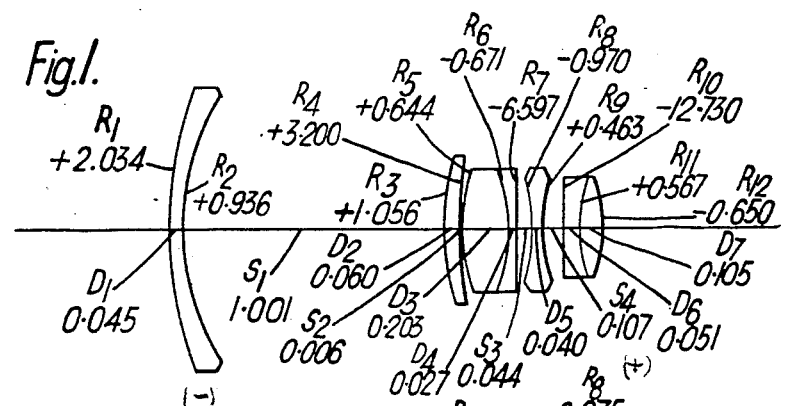

July 30, 1963  P. A. MERIGOLD  3,099,701

OPTICAL OBJECTIVES

Filed Aug. 10, 1960

Inventor
P. A. Merigold
By
Attorneys

# United States Patent Office 3,099,701
Patented July 30, 1963

3,099,701
OPTICAL OBJECTIVES
Peter Arnold Merigold, Leicester, England, assignor to Rank Precision Industries Limited, trading as Taylor, Taylor & Hobson, Leicester, England, a company of Great Britain
Filed Aug. 10, 1960, Ser. No. 48,602
Claims priority, application Great Britain Aug. 12, 1959
21 Claims. (Cl. 88—57)

This invention relates to an optical objective corrected for spherical and chromatic aberrations, coma, astigmatism, field curvature and distortion, and of the type often known as the "inverted telephoto" type, in which by the use of a divergent front member widely separated from a convergent rear member, the ratio between the back focal length and the equivalent focal length of the objective is made relatively large. Such large back focal length makes the objective convenient for use in circumstances in which it is desired to insert some device, such for example as the inclined mirror of a reflex camera, between the rear surface of the objective and the rear focal plane. Most objectives of this type have suffered from the drawback of having a much greater overall axial length than the more traditional types of photographic objective, but in some instances some reduction in overall axial length has been achieved by the use of a rear member having four components, of which the first, second and fourth (counting from the front) are convergent and the third is divergent.

The present invention has for its object to provide an improved objective of this kind having a much reduced overall axial length, whilst still retaining adequate back focal length relative to the equivalent focal length of the objective, and also having improved aberration correction.

It should be made clear that the terms "front" and "rear," as used herein, relate to the sides of the objective respectively nearer to and further from the longer conjugate, in accordance with the usual convention.

The objective according to the invention comprises a divergent front member separated by a large air space lying between .8F and 1.4F (where F is the equivalent focal length of the complete objective) from a convergent rear member having four components, of which the first (counting from the front) is a simple convergent meniscus component with its surfaces convex to the front, the second and fourth are convergent doublet components, and the third is a simple biconcave divergent component, with the diaphragm between the third and fourth components, the numerical values of the equivalent focal lenghs $f_F$ of the divergent front member and $f_R$ of the convergent rear member lying respectively between 2.5F and 5F and between .8F and 1.4F, whilst the axial air separations between the second and third components of the rear member and between the third and fourth components thereof lie respectively between $.04f_R$ and $.055f_R$ and between $.075f_R$ and $.2f_R$, the radius of curvature of the front surface of the divergent third component of the rear member lying between $.75f_R$ and $1.45f_R$ and being less than one-sixth of that of the rear surface of the doublet second component of the rear member, the mean refractive index of the material of the rear element of the doublet fourth component of the rear member exceeding that of the front element thereof by between .025 and .075. This arrangement enables good correction to be obtained for all the primary aberrations, including coma and astigmatism, for a reasonably high relative aperture, for example of the order of f/2.8, and over a wide angle of view, say 64 degrees.

It is usually desirable to make the divergent front member of simple construction, for example in the form of a simple meniscus component, although a somewhat more complex construction of front member may be called for if it is desired to increase the relative aperture or the angle of view. An increased relative aperture can, however, be obtained by making one of the surfaces of the rear member aspheric, for example one of the surfaces of the doublet rear component, preferably the front surface of such component. The choice of surface to be made aspheric and the degree of asphericity will usually in practice be such as primarily to give correction at the increased aperture for spherical aberration, at least for one chosen wave-length, and to contribute towards correction of the other aberrations, especially oblique aberrations.

Whether or not one of the surfaces is made aspheric, it is preferable, for further assisting in the correction of coma and astigmatism, for the rear surface of the rear component of the rear member to be concave to the front, with radius of curvature (at least at its vertex) lying between $.4f_R$ and $.8f_R$ and bearing a ratio to the radius of curvature (at least at its vertex) of the internal contact in such rear component lying between .8 and 1.33, such internal contact being convex to the front.

It will be appreciated that the term "internal contact," as herein used, is to be understood as including, not only a cemented internal contact surface, but also what is commonly known as a "broken contact," that is an assembly of two contacting surfaces of slightly different curvatures within the component. In the case of a "broken contact," the radius of curvature thereof is to be understood to be the arithmetic mean between the radii of curvature of its two constituent surfaces, whilst its power is to be understood to be the harmonic mean between the powers of the two constituent surfaces.

It is preferable for the correction of spherical aberration, that the radius of curvature of the front surface of the divergent third component of the rear member should lie between 1.7 and 2.5 times that of the rear surface of such component, the radius of curvature (at least at the vertex) of the front surface of the doublet rear component of the rear member being at least $5f_R$. Conveniently, the radii of curvature of the front and rear surfaces of the meniscus front component of the rear member lie respectively between $.75f_R$ and $1.5f_R$ and between $2.5f_R$ and $4.5f_R$, the front surface of the second component of the rear member also being convex to the front and having radius of curvature between .45 and .75 times that of the front surface of the front component of the rear member, thus contributing towards correction of coma and astigmatism and assisting further in the correction of spherical aberration.

A suitable disposition of optical power in the components in front of the diaphragm is desirable for correction of various aberrations, especially astigmatism and distortion. To this end, preferably, the numerical values of the equivalent focal lengths of the second, third and fourth components of the rear member lie respectively between $.75f_R$ and $1.25f_R$, between $.4f_R$ and $.75f_R$ and between $.75f_R$ and $1.25f_R$, and the axial length of the rear member from the front surface of its first component to the rear surface of its fourth component lies between $.6f_R$ and $1.0f_R$. In addition, conveniently, the overall axial length from the front surface of the front member to the rear focal plane of the objective preferably lies between 2.4F and 3.2F, the equivalent focal length of the convergent first component of the rear member lying between $2f_R$ and $3f_R$.

Preferably, for correction of chromatic aberrations, when the front member of the objective consists of a simple component, the arithmetic mean of the mean refractive indices of the materials of all the elements of the objective is greater than 1.635, and the Abbé V number of the material of the front member exceeds 58, the arithmetic mean of the Abbé V numbers of the materials of the two elements of the doublet second component of the rear member lying between 50 and 60, whilst the Abbé V number of the material of the rear element of the doublet rear component of the rear member exceeds that of the front element of such component by between 16 and 24.

Figure 2:
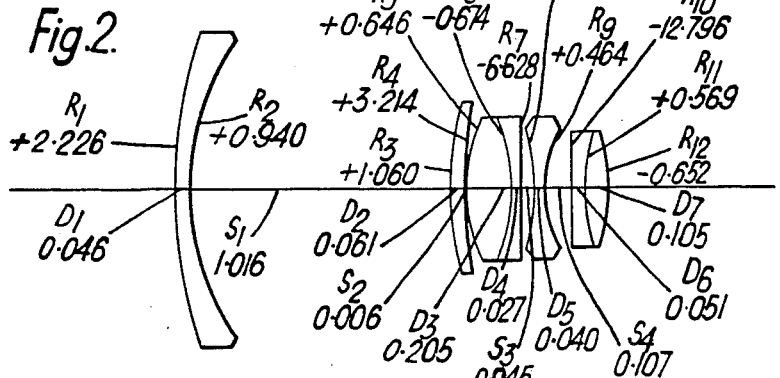
Figure 3:
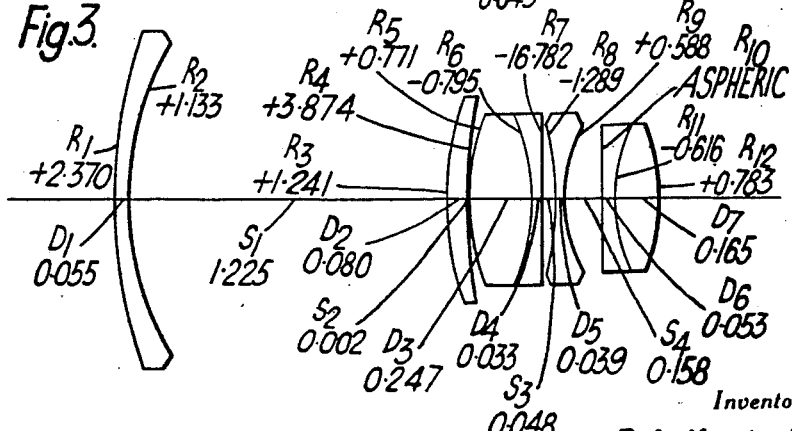

Three convenient practical examples of inverted telephoto objective according to the invention are diagrammatically illustrated respectively in FIGURES 1-3 of the accompanying drawings, and numerical data for these examples are given in the following tables, in which $R_1, R_2 \ldots$ represent the radii of curvature of the individual surfaces of the objective counting from the front, the positive sign indicating that the surface is convex to the front and the negative sign that it is concave to the front; $D_1, D_2 \ldots$ represent the axial thicknesses of the individual elements of the objective; and $S_1 S_2 \ldots$ represent the axial air separations between the components of the objective. The tables also give the mean refractive index $n_d$ for the $d$-line of the spectrum and the Abbé V number of each of the materials used for the elements of the objective.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

*Example I*

[Equivalent focal length 1.000. Relative aperture F/2.8]

| Radius | Thickness or air separation | Refractive index $n_d$ | Abbé V number |
|---|---|---|---|
| $R_1 = +2.034$ | | | |
| | $D_1=0.045$ | 1.60557 | 60.02 |
| $R_2 = +0.936$ | | | |
| | $S_1=1.001$ | | |
| $R_3 = +1.056$ | | | |
| | $D_2=0.060$ | 1.70000 | 41.18 |
| $R_4 = +3.200$ | | | |
| | $S_2=0.006$ | | |
| $R_5 = +0.644$ | | | |
| | $D_3=0.203$ | 1.69100 | 54.8 |
| $R_6 = -0.671$ | | | |
| | $D_4=0.027$ | 1.65100 | 58.6 |
| $R_7 = -6.597$ | | | |
| | $S_3=0.044$ | | |
| $R_8 = -0.970$ | | | |
| | $D_5=0.040$ | 1.62576 | 35.74 |
| $R_9 = +0.463$ | | | |
| | $S_4=0.107$ | | |
| $R_{10}= -12.730$ | | | |
| | $D_6=0.051$ | 1.62576 | 35.74 |
| $R_{11}= +0.567$ | | | |
| | $D_7=0.105$ | 1.69100 | 54.8 |
| $R_{12}= -0.650$ | | | |

*Example II*

[Equivalent focal length 1.000. Relative aperture F/2.8]

| Radius | Thickness or air separation | Refractive index $n_d$ | Abbé V number |
|---|---|---|---|
| $R_1 = +2.226$ | | | |
| | $D_1=0.046$ | 1.56380 | 60.48 |
| $R_2 = +0.940$ | | | |
| | $S_1=1.016$ | | |
| $R_3 = +1.060$ | | | |
| | $D_2=0.061$ | 1.70000 | 41.18 |
| $R_4 = +3.214$ | | | |
| | $S_2=0.006$ | | |
| $R_5 = +0.646$ | | | |
| | $D_3=0.205$ | 1.69100 | 54.8 |
| $R_6 = -0.674$ | | | |
| | $D_4=0.027$ | 1.65100 | 58.6 |
| $R_7 = -6.628$ | | | |
| | $S_3=0.045$ | | |
| $R_8 = -0.975$ | | | |
| | $D_5=0.040$ | 1.62576 | 35.74 |
| $R_9 = +0.464$ | | | |
| | $S_4=0.107$ | | |
| $R_{10}= -12.796$ | | | |
| | $D_6=0.051$ | 1.62576 | 35.74 |
| $R_{11}= +0.569$ | | | |
| | $D_7=0.105$ | 1.69100 | 54.8 |
| $R_{12}= -0.652$ | | | |

*Example III*

[Equivalent focal length 1.000. Relative aperture F/2.0]

| Radius | Thickness or air separation | Refractive index $n_d$ | Abbé V number |
|---|---|---|---|
| $R_1 = +2.370$ | | | |
| | $D_1=0.055$ | 1.55154 | 63.54 |
| $R_2 = +1.133$ | | | |
| | $S_1=1.225$ | | |
| $R_3 = +1.241$ | | | |
| | $D_2=0.080$ | 1.70000 | 41.18 |
| $R_4 = +3.874$ | | | |
| | $S_2=0.002$ | | |
| $R_5 = +0.771$ | | | |
| | $D_3=0.247$ | 1.69100 | 54.8 |
| $R_6 = -0.795$ | | | |
| | $D_4=0.033$ | 1.65350 | 53.39 |
| $R_7 = -16.782$ | | | |
| | $S_3=0.048$ | | |
| $R_8 = -1.289$ | | | |
| | $D_5=0.039$ | 1.62576 | 35.74 |
| $R_9 = +0.588$ | | | |
| | $S_4=0.158$ | | |
| $R_{10}= +8.0$ [1] | | | |
| | $D_6=0.053$ | 1.62576 | 35.74 |
| $R_{11}= +0.616$ | | | |
| | $D_7=0.165$ | 1.69100 | 54.8 |
| $R_{12}= -0.783$ | | | |

[1] Aspheric.

Equation for aspheric surface $R_{10}$:—

$$x = (8.0 - \sqrt{8^2 - y^2}) + 0.347y^4 + 1.483y^4 + 2.84y^6$$

Of these examples, the first two have wholly spherical surfaces and are corrected for a relative aperture of F/2.8 to cover an angular field of 64 degrees, whilst in Example III a higher relative aperture of F/2.0 is achieved, with an angular coverage of 62 degrees, by making the front surface $R_{10}$ of the doublet rear component of the rear member aspheric. The equation above given for the aspheric surface is in rectangular coordinates with the origin at the vertex of the surface, $y$ being the coordinate radial to the optical axis, whilst $x$ is the axial departure of the curve from the transaxial plane through the vertex and is taken as positive in the direction from such plane towards the rear. The radius of curvature of the aspheric curve at the vertex is 8.0, the surface being convex towards the front, and there is a slight departure from the basic spherical surface of radius 8.0, such departure being negligibly small near the the optical axis and increasing slightly as the distance from such axis increases, the departure from the basic spherical surface in this particular example being towards the rear.

The surface $R_{10}$ is chosen as the aspheric surface, since its location is the most favourable for the additional aberration correction required for the increased aperture, and the slight departure from the basic spherical surface is chosen primarily to give substantially complete spherical aberration correction for one chosen wave-length and also at the same time to assist in the further correction for the other aberrations.

In these examples, the back focal length from the rear surface of the rear member to the rear focal plane is 0.997F in Example I, 1.000F in Example II and 0.925F in Example III. The diaphragm is located 0.049F in front of the surface $R_{10}$ in Example I and 0.050F in front of such surface in Examples II and III.

The equivalent focal length $f_R$ of the complete rear member is 1.042F in Example I, 1.0475F in Example II and 1.113F in Example III. The radius of curvature $R_8$ of the front surface of the divergent rear component of the rear member is $0.93f_R$ in Examples I and II and $1.16f_R$ in Example III. The axial separation $S_3$ between this surface and the surface $R_7$ is $.042f_R$ in Example I and $.043f_R$ in Examples II and III. The axial separation $S_4$ between the third and fourth components of the rear member is $.016f_R$ in Examples I and II and $.014f_R$ in Example III.

The radius of curvature of the front surface $R_8$ of the divergent third component of the rear member is 2.1 times that of the rear surface $R_9$ of such component in Examples I and II and 2.2 times that of such rear surface in Example III.

The radius of curvature $R_3$ of the front surface of the front component of the rear member has the value $1.01f_R$ in Examples I and II and $1.1f_R$ in Example III, and the radius $R_4$ of the rear surface of such component has the value $3.1f_R$ in Examples I and II and $3.5f_R$ in Example III. The ratio of the radius $R_5$ of the front surface of the second component of the rear member to such radius $R_3$ is .61 in Examples I and II and .62 in Example III.

The equivalent focal lengths of the first, second, third and fourth components of the rear member respectively have the numerical values 2.224F or $2.13f_R$, 0.827F or $0.79f_R$, 0.495F or $0.475f_R$ and 0.887F or $0.85f_R$ in Example I, 2.234F or $2.13f_R$, 0.830F or $0.79f_R$, 0.498F or $0.475f_R$, and 0.890F or $0.85f_R$ in Example II, and 2.578F or $2.31f_R$, 1.029F or $0.92f_R$, 0.640F or $0.575f_R$ and 0.952F or $0.855f_R$ in Example III. The axial length of the rear member has the value 0.643F or $0.617f_R$ in Example I, 0.648F or $0.619f_R$ in Example II and 0.824F or $0.740f_R$ in Example III. The equivalent focal length of the front member has the numerical value 2.90F in Example I, 2.92F in Example II and 3.99F in Example III. The overall axial length from the front surface of the objective to the rear focal plane is 2.686F in Example I, 2.710F in Example II and 3.029F in Example III.

The radius of curvature $R_{12}$ of the rear surface of the rear member has the value $0.62f_R$ in Examples I and II and $0.70f_R$ in Example III. The ratio of such radius $R_{12}$ to the radius $R_{11}$ of the internal contact in the rear component is 1.15 in Examples I and II and 1.27 in Example III.

The arithmetic mean of the mean refractive indices of the materials of all the elements of the objective is 1.656 in Example I, 1.650 in Example II and 1.648 in Example III.

All three examples are well corrected for all the primary aberrations for their respective relative apertures and their angular fields and have good vignetting characteristics. Examples I and II have been designed especially for use as objectives in 35 mm. television cameras and their calculation has taken into account the slight further correction required for the glass plate at the front of the television tube. Example III has been calculated especially for use in a 35 mm. cinematographic camera, for which of course such further slight correction is not required. In addition to the good aberration correction and improved vignetting characteristics above mentioned, the objectives according to the invention have the advantage over prior known inverted telephoto objectives of much reduced bulk and weight.

Although in all these examples, the front member is in the form of a single simple component, a slightly more complex front member may be desirable in some instances when an increased angular field is desired. In such case, if an aspheric surface is provided, it may prove more convenient to choose either the internal contact or the rear surface of the rear component of the rear member for this purpose.

What I claim as my invention and desire to secure by Letters Patent is:

1. An optical objective of the inverted telephoto type corrected for spherical and chromatic aberrations, coma, astigmatism, field curvature and distortion, comprising a divergent front member the numerical value of whose equivalent focal length lies between 2.5F and 5F where F is the equivalent focal length of the complete objective, and a convergent rear member, whose equivalent focal length $f_R$ lies between .8F and 1.4F, separated from the front member by an air space whose axial length lies between .8F and 1.4F, the convergent rear member comprising a simple convergent meniscus first component having its surfaces convex to the front, a convergent doublet second component behind the first component, a simple biconcave divergent third component behind the second component, a convergent doublet fourth component behind the third component, and a diaphragm located between the third and fourth components, the axial air separations between the second and third components and between the third and fourth components of the rear member lying respectively between $.04f_R$ and $.055f_R$ and between $.075f_R$ and $.2f_R$, whilst the radius of curvature of the front surface of the divergent third component of the rear member lies between $.75f_R$ and $1.45f_R$ and is less than one-sixth of that of the rear surface of the doublet second component of the rear member, the mean refractive index of the material of the rear element of the doublet fourth component of the rear member exceeding that of the front element thereof by between .025 and .075.

2. An optical objective as claimed in claim 1, in which the rear surface of the doublet rear component of the rear member is concave to the front and the radius of curvature (at least at the vertex) of such rear surface lies between $.4f_R$ and $.8f_R$ and bears a ratio to the radius of curvature (at least at the vertex) of the internal contact in such rear component lying between .8 and 1.33, such internal contact being convex to the front.

3. An optical objective as claimed in claim 2, in which the radius of curvature of the front surface of the divergent third component of the rear member lies between 1.7 and 2.5 times that of the rear surface of such component, and the radius of curvature (at least at the vertex) of the front surface of the doublet rear component is at least $5f_R$.

4. An optical objective as claimed in claim 3, in which one of the surfaces of the doublet rear component of the rear member is slightly aspheric.

5. An optical objective as claimed in claim 4, in which the aspheric surface is the front surface of the doublet rear component.

6. An optical objective as claimed in claim 2, in which the radii of curvature of the front and rear surfaces of the meniscus front component of the rear member lie respectively between $.75f_R$ and $1.5f_R$ and between $2.5f_R$ and $4.5f_R$, and the front surface of the second component of the rear member is convex to the front and has radius of curvature between .45 and .75 times that of the front surface of the front component of the rear member.

7. An optical objective as claimed in claim 2, in which the numerical values of the equivalent focal lengths of the second, third and fourth components of the rear member lie respectively between $.75f_R$ and $1.25f_R$, between $.4f_R$ and $.75f_R$, and between $.75f_R$ and $1.25f_R$, and the axial length of the rear member from the front surface of its front component to the rear surface of its rear component lies between $.6f_R$ and $1.0f_R$.

8. An optical objective as claimed in claim 2, in which the equivalent focal length of the meniscus first component of the rear member lies between $2f_R$ and $3f_R$, the overall axial length from the front surface of the divergent front member to the rear focal plane of the objective lying between 2.4F and 3.2F.

9. An optical objective as claimed in claim 2, in which the front member of the objective consists of a simple component made of a material whose Abbé V number exceeds 58, the arithmetic mean of the Abbé V numbers of the materials of the two elements of the doublet second component of the rear member lying between 50 and 60, whilst the Abbé V number of the material of the rear element of the doublet rear component of the rear member exceeds that of the front element of such component by between 16 and 24, the arithmetic mean of the mean refractive indices of the materials of all the elements of the objective being greater than 1.635.

10. An optical objective as claimed in claim 1, in which the radius of curvature of the front surface of the divergent third component of the rear member lies between 1.7 and 2.5 times that of the rear surface of such component, and the radius of curvature (at least at the vertex) of the front surface of the doublet rear component is at least $5f_R$.

11. An optical objective as claimed in claim 10, in which the radii of curvature of the front and rear surfaces of the meniscus front component of the rear member lie respectively between $.75f_R$ and $1.5f_R$ and between $2.5f_R$ and $4.5f_R$, and the front surface of the second component of the rear member is convex to the front and has radius of curvature between .45 and .75 times that of the front surface of the front component of the rear member.

12. An optical objective as claimed in claim 11, in which the front surface of the doublet rear component of the rear member is slightly aspheric.

13. An optical objective as claimed in claim 10, in which the numerical values of the equivalent focal lengths of the second, third and fourth components of the rear member lie respectively between $.75f_R$ and $1.25f_R$, between $.4f_R$ and $.75f_R$, and between $.75f_R$ and $1.25 f_R$, and the axial length of the rear member from the front surface of its front component to the rear surface of its rear component lies between $.6f_R$ and $1.0 f_R$.

14. An optical objective as claimed in claim 10, in which the equivalent focal length of the meniscus first component of the rear member lies between $2f_R$ and $3f_R$, the overall axial length from the front surface of the divergent front member to the rear focal plane of the objective lying between 2.4F and 3.2F.

15. An optical objective as claimed in claim 10, in which the front member of the objective consists of a simple component made of a material whose Abbé V number exceeds 58, the arithmetic mean of the Abbé V numbers of the materials of the two elements of the doublet second component of the rear member lying between 50 and 60, whilst the Abbé V number of the material of the rear element of the doublet rear component of the rear member exceeds that of the front element of such component by between 16 and 24, the arithmetic mean of the mean refractive indices of the materials of all the elements of the objective being greater than 1.635.

16. An optical objective as claimed in claim 1, in which the radii of curvature of the front and rear surfaces of the meniscus front component of the rear member lie respectively between $.75f_R$ and $1.5f_R$ and between $2.5f_R$ and $4.5f_R$, and the front surface of the second component of the rear member is convex to the front and has radius of curvature between .45 and .75 times that of the front surface of the front component of the rear member.

17. An optical objective as claimed in claim 1, in which the numerical values of the equivalent focal lengths of the second, third and fourth components of the rear member lie respectively between $.75f_R$ and $1.25f_R$, between $.4f_R$ and $.75f_R$, and between $.75f_R$ and $1.25f_R$, and the axial length of the rear member from the front surface of its front component to the rear surface of its rear component lies between $.6f_R$ and $1.0f_R$.

18. An optical objective as claimed in claim 1, in which the equivalent focal length of the meniscus first component of the rear member lies between $2f_R$ and $3f_R$, the overall axial length from the front surface of the divergent front member to the rear focal plane of the objective lying between 2.4F and 3.2F.

19. An optical objective as claimed in claim 1, in which the front member of the objective consists of a simple component made of a material whose Abbé V number exceeds 58, the arithmetic mean of the Abbé V numbers of the materials of the two elements of the doublet second component of the rear member lying between 50 and 60, whilst the Abbé V number of the material of the rear element of the doublet rear component of the rear member exceeds that of the front element of such component by between 16 and 24, the arithmetic mean of the mean refractive indices of the materials of all the elements of the objective being greater than 1.635.

20. An optical objective as claimed in claim 1, in which one of the surfaces of the doublet rear component of the rear member is slightly aspheric.

21. An optical objective as claimed in claim 20, in which the aspheric surface is the front surface of the doublet rear component.

References Cited in the file of this patent

UNITED STATES PATENTS

| | | |
|---|---|---|
| 2,649,022 | Angenieux | Aug. 18, 1953 |
| 2,927,506 | Determann | Mar. 8, 1960 |

FOREIGN PATENTS

| | | |
|---|---|---|
| 205,765 | Austria | Oct. 10, 1959 |
| 236,052 | Switzerland | June 1, 1945 |